J. CRISWELL.
THRESHING MACHINE AND CORN SHELLER.
No. 1,864.  Patented Nov. 26, 1840.
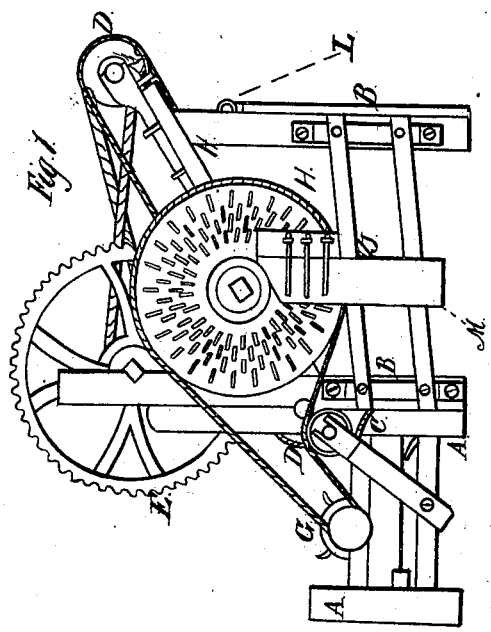
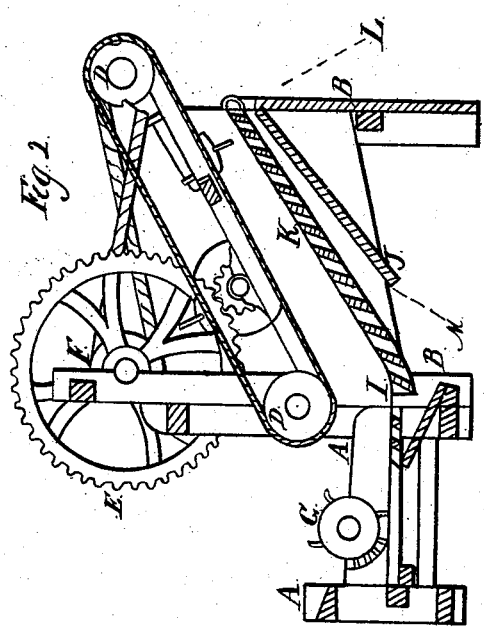
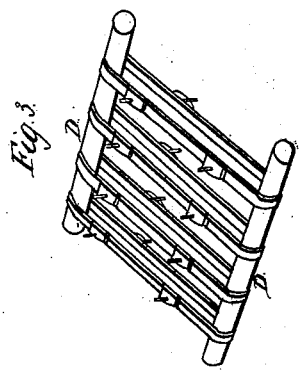

UNITED STATES PATENT OFFICE.

JOHN CRISWELL, OF CECIL TOWNSHIP, WASHINGTON COUNTY, PENNSYLVANIA.

METHOD OF REMOVING STRAW AND SEPARATING THE GRAIN IN THRESHING-MACHINES.

Specification of Letters Patent No. 1,864, dated November 26, 1840.

*To all whom it may concern:*

Be it known that I, JOHN CRISWELL, of Cecil township, in the county of Washington and State of Pennsylvania, have invented a new and Improved Mode of Removing Straw from Threshing - Machines; and I do hereby declare that the following is a full and exact description.

The nature of my invention consists in providing rakes and an open rack underneath, by which a complete separation takes place between the straw and the grain, and the straw is removed to a convenient place.

To enable others skilled in the art, to make and use my invention I will proceed to describe its construction and application, and its connection with a threshing machine of any of the known forms.

A A A A in the accompanying drawing is a representation of the frame of a common threshing machine.

B B B B is a side view of a frame six feet long and of a width exactly equal to the width of the frame of the thresher, and fastened thereto by a hook on each side as at C, and the space between the side rails is boarded up tight.

D D are two rollers, one foot diameter and of length equal to the width of the frame, and are hung with iron gudgeons fixed in the upper side rail of the frame; around these rollers are two leather straps four inches wide to which eight rakes are attached by screws or other fastenings. The rollers or rakes are put in motion by two pulleys and a cord or rope, to wit: one pulley six inches in diameter and two inches thick with a band race, fastened on the outside and on the center of the driving wheel of the threshing machine (E). This pulley is fastened to said wheel by means of clasps around the arms of said wheel, and screws, &c. The second pulley is fixed on the shaft of the roller most distant from the threshing machine and is two feet diameter as at F, of the same thickness as the former, &c.

It is observable that in constructing the frame B, care must be taken that it be of the same height of the frame of the threshing machine at the end next to the thresher; and the rakes must move in an inclined direction, say an inclined elevation of thirty to thirty five degrees from the threshing machine; moreover, the rakes, when revolving around the roller next the thresher, ought to pass as near to the teeth of the cylinder as they safely can, and at the same time near the sheeting of the concave.

G is the cylinder of the threshing machine. The open spaces on the sides of the frame, marked H between the upper rails of the frame B and the rollers D, must be closed with plank; underneath the rakes I place an open rack the whole length and breadth of the frame; at the end next to the threshing machine I place the open rack on a level with the sheeting of the concave of the thresher and give it the same elevation with the track of the rakes, as shown by a line marked I; underneath this open rack, I place a short board for the purpose of bringing back any grain that may chance to be drawn near to the extreme end of the frame where the straw is discharged, as shown by the line marked J.

What I claim as my invention, and desire to secure by Letters Patent, consists in—

Forming the rack marked K, as an inclined plane and carrying the straw over it by a belt of rakes passing over rollers, by which rakes, the straw is removed to a convenient place marked L, and the grain by passing through the open rack is completely separated from the straw and is also collected and deposited in a convenient place at M.

JOHN CRISWELL.

Witnesses:
 J. E. BLACK,
 ROBERT RALSTON.